United States Patent [19]

Turek

[11] 4,133,405
[45] Jan. 9, 1979

[54] OVERHEAD INSTRUMENT CONSOLE

[76] Inventor: Timothy R. Turek, 605 S. Prospect, Redondo Beach, Calif. 90277

[21] Appl. No.: 850,785

[22] Filed: Nov. 11, 1977

[51] Int. Cl.² ............................................. B60K 35/00
[52] U.S. Cl. ...................................... 180/90; 350/307
[58] Field of Search ............... 180/90, 77 R; 296/1 R; 350/307; 340/220; 73/117.3

[56] References Cited

U.S. PATENT DOCUMENTS

| | | | |
|---|---|---|---|
| 2,023,719 | 12/1935 | Arrison | 180/90 X |
| 2,091,011 | 8/1937 | Phelps | 296/1 R X |
| 2,573,812 | 11/1951 | Schroeder | 350/307 X |
| 3,194,338 | 7/1965 | Rutman | 180/90 |

FOREIGN PATENT DOCUMENTS

| | | | |
|---|---|---|---|
| 673763 | 1/1930 | France | 180/90 |
| 1040148 | 8/1966 | United Kingdom | 350/307 |

Primary Examiner—Joseph F. Peters, Jr.
Assistant Examiner—Terrance L. Siemens
Attorney, Agent, or Firm—Singer & Singer

[57] ABSTRACT

This invention describes a system for displaying instruments in an overhead console in an automobile. A transverse instrument panel is located against the roofline of an automobile and located transverse of the automobile above the forward windshield. A centrally located cutout in the transverse panel allows a fore and aft beam to be attached to the roof member in the area of the rear view mirror at the forward part and near the dome light in the rearward portion. Tapered brackets attached to the fore and aft brace member hold instrument panels on each side and on the bottom most portion to thereby provide instrument panel space on both the driver's side and the passenger's side. The fore and aft instrument panels mate with the transverse panels giving the appearance of a single overhead instrument console.

9 Claims, 8 Drawing Figures

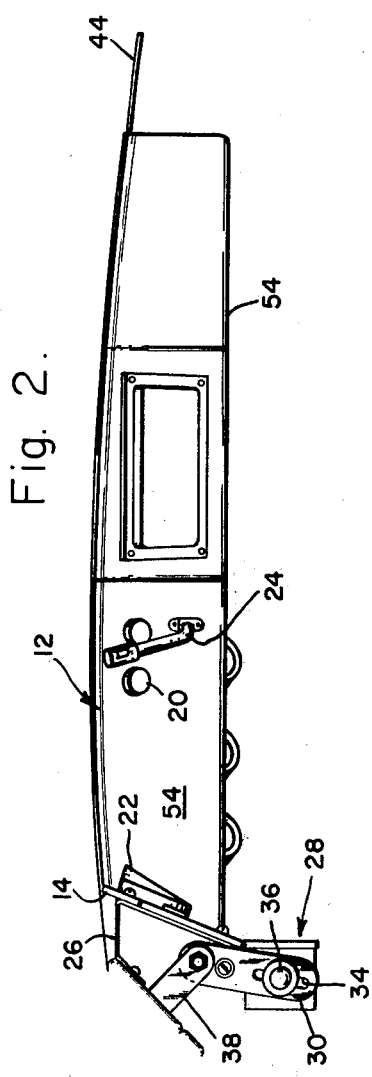
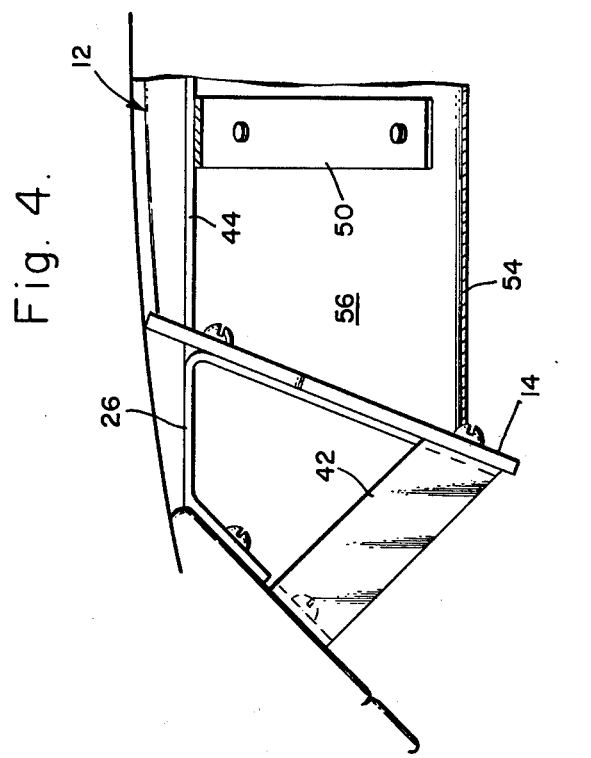
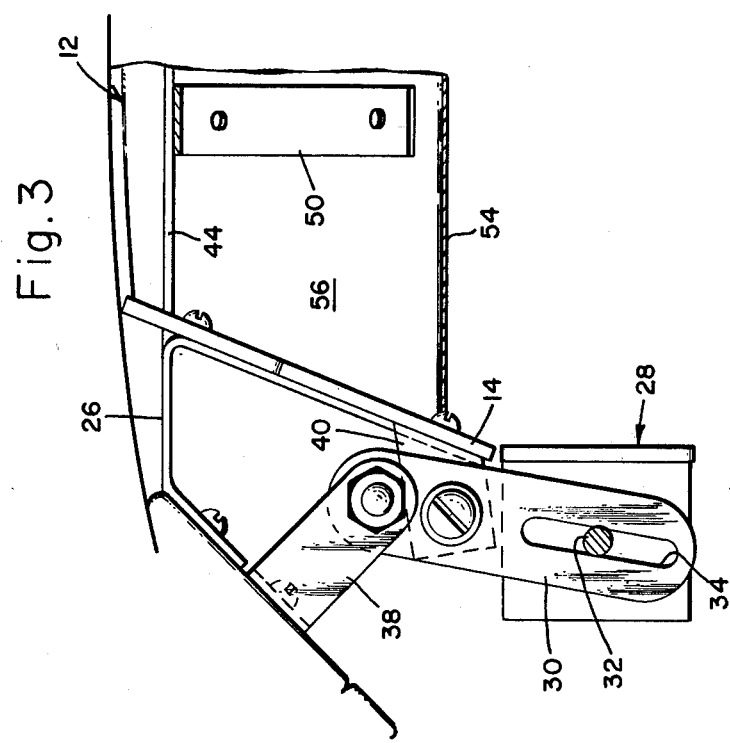

OVERHEAD INSTRUMENT CONSOLE

This invention relates to an overhead instrument panel for use with automobiles and more particularly to an overhead instrument console that may be added to the average automobile in order to allow the owner the option of adding additional instruments and display indicators that allow the owner to customize the interior of his car regardless of how the car was originally designed and built.

In the field of customizing automobiles, trucks and vans, it has become the style to add additional instruments and monitoring equipment of all facets of the automobile's operation.

The manufacturers in an effort to reduce the costs of their product have gradually eliminated certain instruments that in the past were considered standard. For example, temperature gauges reading the actual temperature of the water in the cylinder block have been replaced with red lights. Ammeter gauges used to measure the charging of the battery or the load on the electrical circuits have been replaced by red lights.

In the art of customizing an automobile, it has been recognized that a gauge, whether it is oil pressure, engine temperature, or even gas supply, while giving quantitative information to the driver, may be overlooked because of the stress or diversions while operating the vehicle. From a safety point of view it has become desirous to supplement quantitative gauges with flashing red lights when a preset condition has been exceeded thereby bringing to the attention of the driver the need for some attention to a detail that should be corrected.

The combination of a flashing light and quantitative information in the form of a readable gauge should indicate to the driver, whether he is experienced or simply a novice, that some matter must be attended to or rechecked in order to safely continue the operation of the vehicle.

In customizing a vehicle it has become desirous to include a plurality of quantitative checks on different facets of the operation of the vehicle and to supplement these quantitative readouts with indicator lights and switches to control a selection of the light or the gauge or both.

The art has developed many sophisticated automobile monitoring systems for detecting and reading out a plurality of engine functions and road functions to the driver of the vehicle. All these functions are in real time and require additional gauges and lights together with the attendant switches and testing apparatus to determine the operativeness of these indicia being detected.

Certain prior art systems for monitoring the operation of automobiles are shown; for example, U.S. Pat. No. 3,988,730 issued to Valker on Oct. 26, 1976; U.S. Pat. No. 3,987,439 issued to Spaniola on Oct. 19, 1976; and U.S. Pat. No. 3,964,302 issued to Gordon, et al., on June 22, 1976, just to mention a few representative systems for detecting and monitoring a vehicle in real time.

These prior art systems require additional space on the instrument panel to house the instrument switches and lights that are attendant with the expanding technology as evidenced by these patents.

The space on a dashboard in a conventional car is severely limited and until the advent of the present invention, the display of these additional meters, gauges, lights and switches has been located in a haphazard manner which has had the converse effect of impairing efficiency and have actually interfered with the operation of the vehicle by the driver.

In this invention an additional instrument console is provided by means of an overhead instrument console that provides additional space and in a manner that does not interfere with the operation of a vehicle and at the same time is aesthetically pleasing to the operator and passengers alike.

The overhead instrument console consists of a transverse instrument panel having a curved upper edge following the roof curvature of the automobile and is located above the front windshield with the upper edge of the transverse console in close proximity to the roofline of the automobile.

The transverse panel is held in place by a plurality of brackets each having the same preset angle for holding the transverse panel at a given angle relative to the driver. The centermost portion of the transverse panel contains a cutout to expose the centermost portion of the roof. In most cars the rear view mirror is located in the centermost portion and the cutout is intended to expose the brackets normally used to support the mirror. For those automobiles that use a windshield supported rear view mirror, the cutout exposes a portion of the roof that provides the forward support for a fore and aft overhead console.

A brace located longitudinally of the automobile in a fore and aft direction and following the contour of the roofline is connected in the forward position to the bracket used only to support the rear view mirror or, in the alternative, to the roof. The brace is supported in a rearward position to the roof near the rear window or to the mounting bracket holding the centrally located dome light if available.

A plurality of tapered brackets are attached to the brace and arranged to hold instrument panels on each side and on the bottommost portion, thereby providing instrument panel space on both the driver side and the passenger side. The fore and aft instrument panel is preferably a single molded panel adapted to mate with the transverse panel at the center, thereby covering the modified opening in the transverse panel and providing a customized overhead instrument console.

Further advantages will be made more apparent to those skilled in the art by referring now to the accompanying drawings wherein:

FIG. 2 is a side view of the overhead instrument console;

FIG. 3 is an enlarged view of the mounting details of the transverse panel illustrated in FIG. 2;

FIG. 4 illustrates the mounting brackets without a full length rear view mirror;

Figure 1:
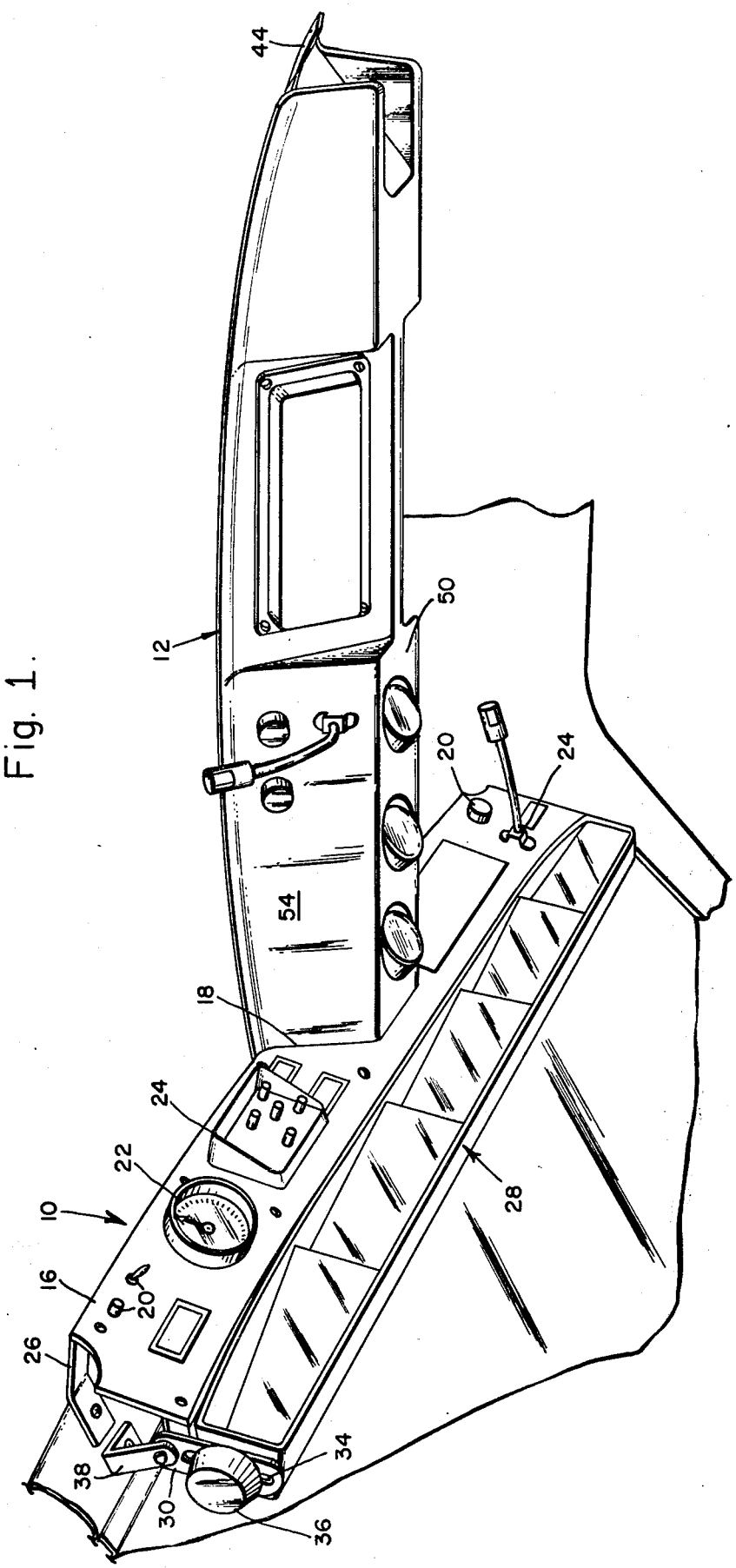
FIG. 1 is a perspective view illustrating an overhead instrument console constructed according to the teachings of this invention.

Referring now to FIG. 1 there is shown a perspective view of the complete overhead instrument console comprising a transverse instrument panel 10 and a longitudinal instrument panel 12 located centrally against the roof of the vehicle and positioned in the fore and aft direction.

The transverse panel 10 and the fore and aft panels 12 are actually separate members that are positioned together so as to appear to be a single overhead instrument console.

An important feature of the design is the flexibility and adaptability of creating an overhead instrument console that can be tailored and modified to the shape of an individual automobile. For example in a two passenger automobile of the Datsun line currently known as the Z series, the transverse panel 10 is located against the roofline and located just above the front windshield. The fore and aft panels 12 are individually contoured to follow the fore and aft roofline and in the forward direction is attached to the same bracket assembly that supports the rear mirror. The rearward support for the fore and aft panels 12 is the bracket assembly that supports the courtesy light that is located centrally in the Datsun just before the rear windscreen. The individual ends of the panels are shaped to follow the contour of the roof of the individual car, thereby giving the appearance of a built-in console rather than giving the appearance of an added-on section.

The individual width and length of the panels are dictated solely by the size of the vehicle that the overhead instrument console is being adapted to. For those automobiles not having a bracket attached to the roofline for holding the rear view mirror, the supporting braces are connected directly to the roofline or to an internal stiffening bar usually located inside the headliner and above the front windscreen.

It is considered preferable not to attach the panels directly to the roofline but rather to insert stiffening braces inside the header and to attach all supporting members to these stiffening braces thereby preventing roof leaks or other attachment points that may be considered unsightly.

The transverse instrument panel 10 consists of a substantially flat panel 14 having an end 16 adapted to follow the contour of the roofline of the automobile. The centermost portion of the panel 14 has a cutout 18 in order to provide access for supporting the fore and aft panels 12. The transverse panel 14 is adapted to provide support for a plurality of switches 20, gauges 22 and accessory items 24 and may be flat or curved depending on the contour of the individual automobile being customized.

The transverse panel 14 is mounted to the automobile by means of a plurality of different sized brackets 26 that are more fully illustrated in connection with FIGS. 2, 3, 4 and 6. All brackets 26 have the same angle thereby ensuring that the transverse panel 14 will have a fixed angle with respect to the driver and passenger.

FIG. 1 illustrates how a commercially available mirror assembly 28 may be hung from the transverse panel 14 and made to appear as a customized installation.

Referring now to FIGS. 1, 2 and 3, there is shown mirror assembly 28 located between opposing brackets 30 located on each end of transverse panel 14. The mirror assembly 28 contains a pin 32 at each end, which pin is adapted to slide within a slot 34 located in the bracket 30. A knob 36 is presently engaged on pin 32 thereby providing a friction support for holding the mirror assembly 28 in a preferred position between opposing brackets 30 and as determined by the preferences of the driver.

Bracket 30 is fixedly attached to an angle bracket 38 that is secured to the roofline of the automobile. An angle bracket 40 interconnects the transverse panel 14 with angle bracket 38 thereby ensuring the rigidity of the end portions of the transverse panel and the end supports for the transverse mirror assembly 28.

A review of FIG. 3 will show the extreme angle between the fixed position of the transverse panel 14 and the substantial vertical position of the transverse mirror 28. The length of the slot 34 provides sufficient adjustment area for the operator of the vehicle to obtain any height or angle position that he finds necessary to obtain a correct viewing position.

Referring now to FIG. 4, there is shown an alternate method of securing transverse panel 14 to the vehicle roof. In the embodiment illustrated in FIG. 4, a conventional centrally located rear view mirror is used and hence it is not necessary for the additional angle supports at the end portion of the transverse panel 14 as was described previously. In this case a single bracket 42 interconnecting the roofline at one end and the end portion of the transverse panel 14 at the other end is all that is necessary to fix the end portions of the transverse panel. In the complete installation, two brackets 42 are used, one at each end, and a conventional mirror either attached to the windshield or to the conventional bracket mirror is used.

Figure 5:
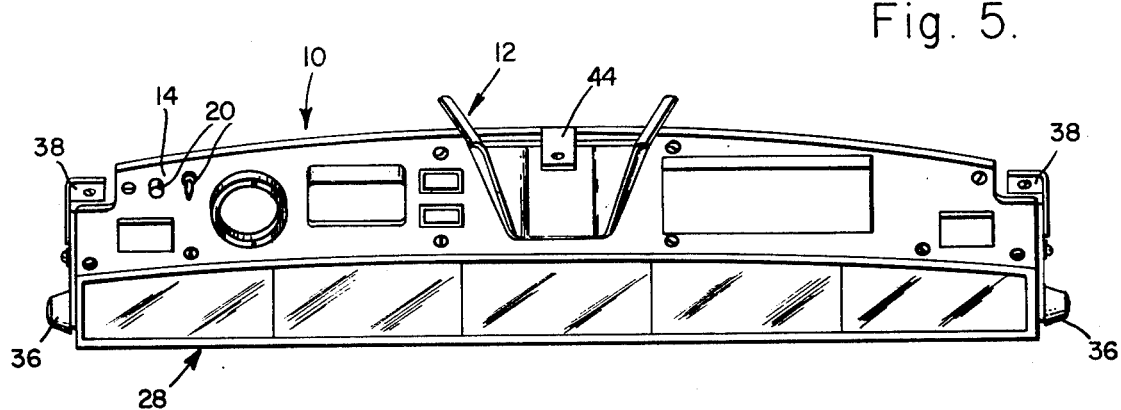
FIG. 5 is a front view of the overhead instrument panel.

Referring now to FIG. 5, there is shown a front view of the overhead instrument console illustrating the transverse instrument panel 10 and the fore and aft instrument panel 12.

Figure 6:
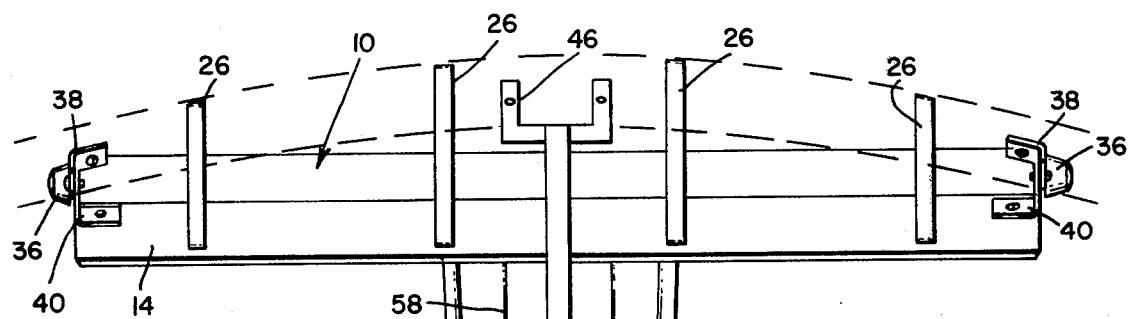
FIG. 6 is a top view of the overhead instrument console.
Figure 7:
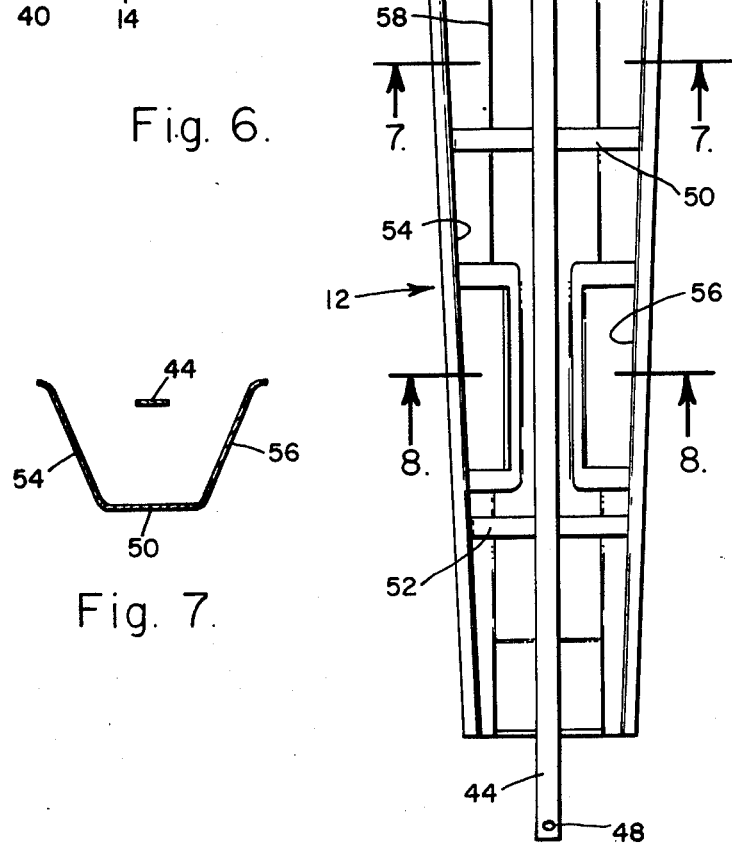
FIG. 7 is a section taken along lines 7—7 of FIG. 6.
Figure 8:
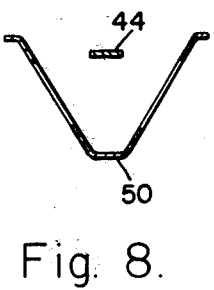
FIG. 8 is a section taken along lines 8—8 of FIG. 6.

FIG. 6 illustrates a top view of the transverse instrument panel 10 and the transverse instrument panel 12 and more fully shows details of construction of the fore and aft instrument panel and how the complete overhead instrument console is supported.

Referring now to FIGS. 5, 6, 7 and 8, there is shown a centrally located brace 44 that is located in close proximity to the roof and extended in a fore and aft longitudinal direction from the front windshield to the rear windshield of the automobile.

The brace 44 in the Datsun Z series car is passed through the central opening located in the transverse panel 14 and is adapted to be attached to the rear view mirror mounting brackets provided to hold the rear view mirror. In those vehicles not having such a bracket the connection is made directly to a metal liner located beneath a cloth liner and used to hold the top of the windshield in position against the roof portion. The rear portion 48 of brace 44 is connected to the bracket holding the rear courtesy light which is usually located in the mid portion of the roof just forward of the rear view mirror. For those vehicles having the courtesy light located in other positions, the attachment point is made to a metal liner located along the roofline and covered by the flexible liner.

The brace 44 provides the backbone support for the longitudinal fore and aft instrument panel 12. A plurality of different sized brackets 50 and 52 is fixedly attached to and hung from main brace 44.

Longitudinal side panels 54 and 56, and having a preferred contour, are extended longitudinally from the transverse panel 14 and in a rearward direction usually to a point just beyond the feet of the driver. A bottommost panel 58 extends from the transverse panel 14 in a rearward direction so as to mate with side panels 54 and 56. Side panels 54 and 56 and bottom panel 58 may be constructed from a single molded piece for attachment to the brackets 50 and 52.

In this fashion side panels 54 and 56 and bottom panel 58 are adapted to hold additional switches, gauges and accessory items determined only by the needs and wants of the owner.

In the usual practice, duplicate instruments are located on the passenger side and additional map reading lights and storage areas may be provided on the overhead console on the passenger's side.

The overhead instrument console actually makes use of space that is not otherwise used and provides a decorative and functional purpose in allowing conventional automobiles to be modified and customized at a minimum expense and with a minimum change to the original contour of the automobile as originally designed.

The invention as described allows any vehicle to be customized and modified by providing an overhead console and since the complete overhead console is added to the original automobile, it is possible when the automobile is sold for the owner to remove the complete console without leaving any effects or changes to the basic automobile as originally purchased. This feature allows the overhead instrument console to be moved from car to car with a minimum of inconvenience and change to the basic automobile and without changing any of the basic design criteria of the automobile as it left the showroom floor.

I claim:

1. In an automobile having a curved roof structure, a front windshield, a rear window, and a courtesy light support bracket a transverse fore and aft overhead structure for holding and displaying instruments comprising:
   a transverse instrument panel having a curved upper edge following the roof curvature of the automobile and located above the front windshield transverse the automobile with the upper edge in close contact with the roof,
   a plurality of brackets interconnecting said transverse panel with the roof,
   a brace located longitudinally of the automobile in a fore and aft direction and interconnecting the roof in a forward position near the forward windshield and in the aft position of the roof near the rear window,
   a plurality of tapered brackets attached to said brace and adapted to hold fore and aft instrument panels on each side and on the bottommost portion whereby additional instrument panel space is provided in the fore and aft position on both the driver and passenger side, and
   said fore and aft instrument panels adapted to mate with the transverse panel at the center thereby providing the appearance of a single uniform structure.

2. A combination according to claim 1 in which said plurality of brackets have different sizes but the same preset angle thereby ensuring a constant angle of the transverse panel regardless of the curvature of the front windshield of the automobile.

3. In an automobile according to claim 1 said transverse panel having an opening at the centermost portion for exposing an area of the roof for attachment to said fore and aft brace member.

4. A combination according to claim 1 in which said transverse instrument panel is attached to a window support bracket located within the header material and is located above and transverse the front windshield.

5. A combination according to claim 1 in which the size of the individual brackets supporting said transverse panel is determined by the curvature of the front windshield and the curvature desired in the transverse instrument panel.

6. A combination according to claim 3 in which said opening in said transverse panel is a modified V for exposing the bracket assembly used to hold a rear view mirror.

7. A combination according to claim 6 in which said fore and aft brace is connected in the forward position to the bracket for holding the rear view mirror.

8. A combination according to claim 1 in which said fore and aft brace is connected to the courtesy light support bracket in the rearward position.

9. A combination according to claim 1 which includes a rear view mirror assembly adjustably supported from the side brackets holding said transverse panel and adjusted both in a vertical and rotatable position.

* * * * *